United States Patent [19]
Keene

[11] Patent Number: 5,170,218
[45] Date of Patent: Dec. 8, 1992

[54] APPARATUS AND METHOD FOR DETECTING WIND DIRECTION

[75] Inventor: Wayne H. Keene, South Natick, Mass.

[73] Assignee: Raytheon Company, Lexington, Mass.

[21] Appl. No.: 677,696

[22] Filed: Mar. 29, 1991

[51] Int. Cl.$^5$ .............................................. G01P 3/36
[52] U.S. Cl. ..................................... 356/28.5; 356/28
[58] Field of Search ................................. 356/28.5, 28

[56] References Cited

U.S. PATENT DOCUMENTS

| | | | |
|---|---|---|---|
| 3,212,085 | 10/1965 | Lhermitte et al. | 343/9 |
| 3,430,240 | 2/1969 | Loesch | 343/17.2 |
| 3,549,256 | 12/1970 | Brienza et al. | 356/4 |
| 3,647,298 | 3/1972 | Soules | 356/5 |
| 3,649,125 | 3/1972 | Lehmann | 356/28 |
| 3,820,896 | 6/1974 | Stavis | 356/28 |
| 3,838,924 | 10/1974 | Flower et al. | 356/28 |
| 3,889,533 | 6/1975 | Balser | 73/189 |
| 3,897,152 | 7/1975 | Farmer et al. | 356/28 |
| 3,915,572 | 10/1975 | Orloff | 356/106 |
| 3,984,685 | 10/1976 | Fletcher et al. | 356/28 |
| 4,168,906 | 9/1979 | Schwiesow | 356/28 |
| 4,340,299 | 7/1982 | Mongeon | 356/28.5 |
| 4,647,933 | 3/1987 | Hogg | 342/26 |
| 4,649,388 | 3/1987 | Atlas | 342/26 |
| 4,652,122 | 3/1987 | Zincone et al. | 356/28.5 |
| 4,735,503 | 4/1988 | Werner et al. | 356/28.5 |

FOREIGN PATENT DOCUMENTS 0009533A 4/1980 European Pat. Off. .
0204295A 12/1986 European Pat. Off. .
1103632 2/1968 United Kingdom .
2176965A 1/1987 United Kingdom .

OTHER PUBLICATIONS

Applied Optics, vol. 24, No. 21, Nov. 1, 1985, C. Werner, "Fast sector scan and pattern recognition for a CW laser Doppler anemometer," pp. 3557–3564.
Research Report DFVLR-FB83-11 of the German Aerospace Research Establishment (Deutsche Forschungs-und Versuchsanhalt fur Luft und Raumfahrt), Erstllung und Erprobung des Laser-Dippler-anemometers zur fenmessung des Windes, F. Kopp, H. Herman, C. Werner, R. Schwiesow and F. Bachstein.

Primary Examiner—Mark Hellner
Attorney, Agent, or Firm—Walter F. Dawson; Christopher L. Maginniss; Richard M. Sharkansky

[57] ABSTRACT

A laser radar system for measuring wind velocities including apparatus for permitting the system to measure the direction of the atmospheric flow field. A modulator is used to chirp the laser frequency toward increasing frequencies. The local oscillator frequency available for homodyning will be offset from the initial transmitted frequency by an amount equal to the chirp rate multiplied by the round trip transit time to the aerosols at the focal point of the converging laser beam. During the up-ramped chirps of the optical beam frequency, the Doppler shift frequency of aerosols moving toward the laser beam will be translated to a lower frequency, and the Doppler shift frequency of aerosols moving away from the laser beam will be frequency translated upward.

17 Claims, 3 Drawing Sheets

APPARATUS AND METHOD FOR DETECTING WIND DIRECTION

BACKGROUND OF THE INVENTION

The present invention relates generally to laser radar systems for measuring winds and, more particularly, to an apparatus and method for measuring the direction of the atmospheric flow field.

Laser radar systems are used for ground wind monitoring in order to improve the accuracy of free rockets and artillery. These ballistic devices are susceptible to deflection due to crosswinds, particularly during the early, low-velocity portions of their trajectories, and a knowledge of the wind velocity within, for example, one hundred meters of their launch sites, permits the initial aiming direction to be compensated for such wind. Ground wind measurements are also becoming increasingly required at airports.

In an illustrative laser radar system used to measure wind velocity, a laser beam is scanned such that its focus describes a closed path which is generally parallel to the earth's surface. Reflections from aerosols at the scanned focal point exhibit a Doppler shift in frequency according to the velocity of the aerosols; this velocity can be measured by beating the return signal with the transmitted beam.

Conventional $CO_2$ laser systems designed to measure winds do not give the direction of the atmospheric flow field. There is an ambiguity in algebraic sign, since these systems do not provide sufficient information on the phase of the return signal and the range from which it was obtained. These systems have a range resolution longer than the wavelength of the radiation, and the ambiguity cannot be resolved by going to smaller range resolutions. Even if this were the case, relative motion of particles within the esolution volume would prevent continuous monitoring of the phase.

The usual way to resolve the ambiguity is to introduce a frequency translation either by means of a second laser offset with respect to the first, or by the addition of an acousto-optic frequency translator such as a Bragg cell or a Raman-Nath cell. Both of these techniques provide fairly accurate determination of the frequency, and the velocity ambiguity can be resolved down to a fraction of a foot per second. Moreover, Bragg cells permit continuous measurement of the wind flow direction. However, the price of these two techniques is quite high. They also suffer from a rather strong feedthrough problem, and do not work near the frequency translation.

SUMMARY OF THE INVENTION

It is therefore a primary object of the present invention to provide an apparatus and method for measuring wind direction.

It is a further object of the present invention to provide a wind direction detecting apparatus for use with a scanning laser beam.

It is a still further object of the present invention to provide a wind direction detecting apparatus which is a relatively simple and inexpensive adjunct to a conventional laser radar system.

These and other objects of this invention are obtained generally by the combination comprising means for transmitting a first electromagnetic modulated signal to a first spatial location and for transmitting a second electromagnetic modulated signal to a second spatial location spaced from the first location. The combination also comprises means for receiving reflections of the first and second signals from aerosols at the respective first and second locations, and means responsive to the first modulated signal and the reflection from the first spatial location for providing a first beat signal, and responsive to the second modulated signal and the reflection from the second spatial location or providing a second beat signal. Finally, the combination comprises means responsive to the relative magnitudes of the first and second beat signals for determining the direction of motion of the aerosols.

In accordance with a preferred embodiment of the present invention, the means for transmitting an electromagnetic signal comprises an optical laser, wherein the signals are modulated by a transducer affixed to one end of the laser which adjusts the length of the laser, thereby chirping the frequency of the optical laser beam toward increasing frequency.

Further in accordance with the present invention, there is disclosed a method for determining wind direction comprising the steps of scanning a laser beam in a substantially circular horizontal plane and detecting aerosol reflections to provide a time-varying Doppler-shifted waveform having maximum amplitudes 180 degrees apart, and transmitting a first modulated signal to the spatial location corresponding to one maximum amplitude and transmitting a second modulated signal to the spatial location corresponding to a second maximum amplitude. The method further comprises the steps of receiving first and second Doppler-shifted reflections from aerosols of the respective first and second modulated signals, and providing a first beat signal from the first Doppler-shifted reflection and the first modulated signal, and a second beat signal from the second Doppler-shifted reflection and the second modulated signal. Finally, the method comprises the step of determining the direction of motion of the aerosols in response to the relative magnitudes of the first and second beat signals.

With this apparatus and method, it is possible to determine the direction of movement of the airborne aerosols. During the up-ramped chirps of the optical beam frequency, the Doppler shift frequency of aerosols moving toward the laser beam will be translated to a lower frequency, and the Doppler shift frequency of aerosols moving away from the laser beam will be frequency translated upward.

BRIEF DESCRIPTION OF THE DRAWINGS

The foregoing features ofthe present invention, and the advantages thereof, may be fully understood from the following detailed description, read in conjunction with the accompanying drawings, wherein.

DESCRIPTION OF THE PREFERRED EMBODIMENT

Figure 1:
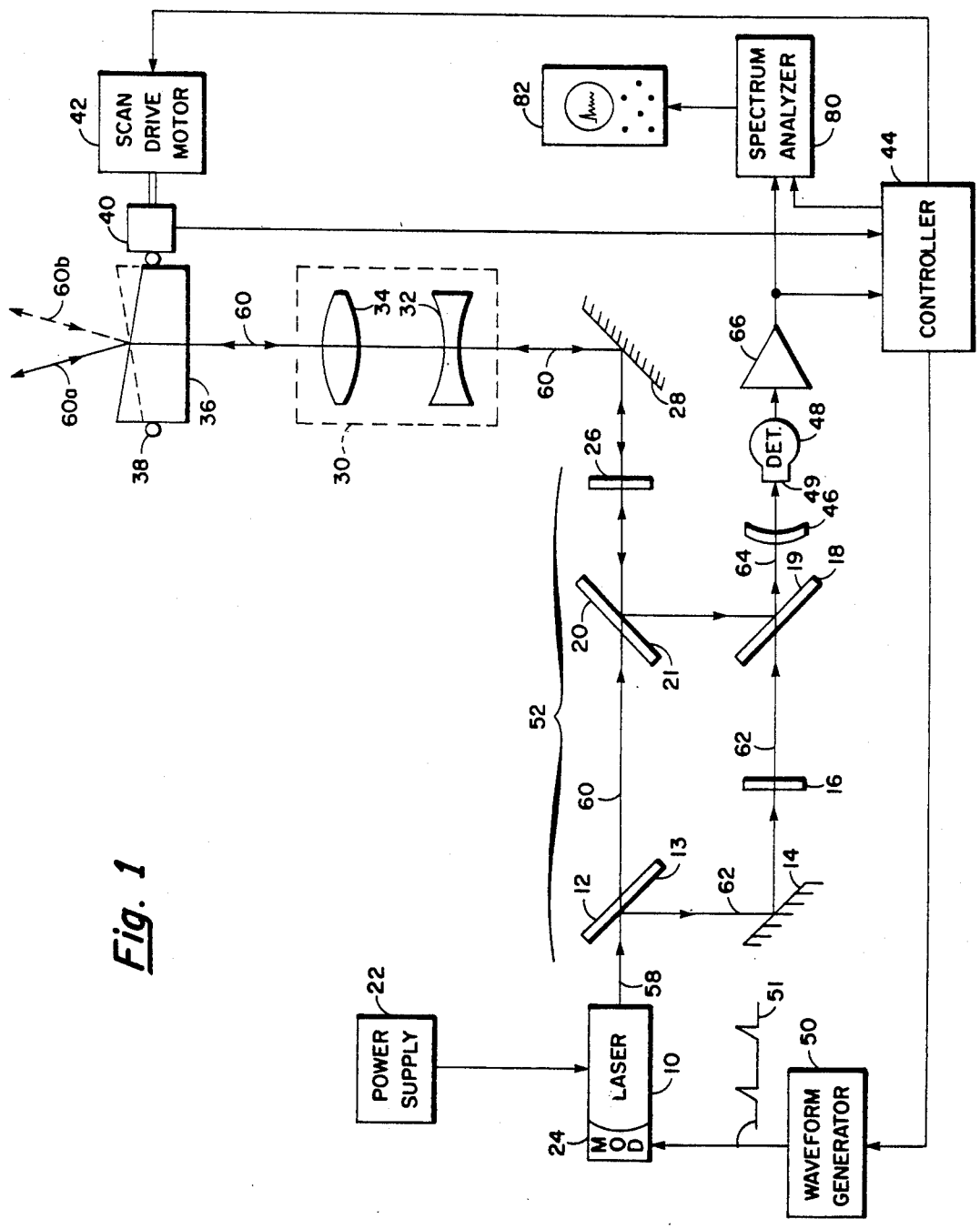
FIG. 1 is a block diagram illustration of a laser radar system in accordance with the principles of the present invention.

Referring to FIG. 1, there is shown a block diagram of a laser radar scanning system in accordance with the present invention. Laser 10 provides a coherent beam 58 of electromagnetic energy which is directed to interferometer 52. A portion of the generated laser beam 58 is reflected by interferometer 52 and is used as the local oscillator beam 62. The major portion of the generated laser beam 58 is used to form the scanning beam 60 for the system. The portion of the transmitted beam 60 that is reflected from targets present in the field of view is returned through interferometer 52 and is then directed to homodyne detector 48, whose output signal is suitably processed to detect the Doppler speed of the targets.

Considering now the system of FIG. 1 in greater detail, laser 10 comprises any known type of laser which will meet the requirements of the particular application, and here, for a selected wavelength in the infrared range, a preferred type is a continuous wave (CW) carbon dioxide ($CO_2$) laser producing a diffraction limited beam at a nominal operating frequency corresponding to the 10.6 microns transition. Laser 10 is responsive to energy provided from power supply 22 to generate a linearly polarized CW laser beam 58 (p-polarized in the present example). In this application, power supply 22 is preferably a DC power source.

Beam 58 from laser 10 is directed onto surface 13 of beamsplitter 12, where a small portion thereof is reflected as local oscillator beam 62. The portion 60 of beam 58 which is transmitted through beamsplitter 12 passes through a Brewster angle polarizer 20 to quarter-waveplate 26, to change the polarization of the p-polarized beam 60 to left-circular polarization. The left-circularly polarized beam 60 now passes through the balance of the beam forming and steering optical system, including mirror 28, telescope 30 and scanning wedge 36, where it is directed toward targets (not shown) which, in the present example, comprise aerosols which are carried by the wind. Telescope 30 comprises a beam expanding lens 32 and a focusing lens 34 which, in this example, converges beam 60 to a point at a distance of approximately 100 meters.

The expanded converging beam 60 from telescope 30 is directed normally onto the lower surface of scanning wedge 36. Scanning wedge 36 is generally cylindrical in shape with the lower surface perpendicular to the central axis of the cylinder and the upper surface inclined at an angle to the central axis of the cylinder. The mounting assembly for scanning wedge 36 includes bearing ring 38 which allows wedge 36 to be rotated about its central axis. Wedge 36 is driven by scan drive motor 42, which is responsive to a control signal from controller 44. Position indicator 40 provides signals to controller 44 indicative of the rotational position of scanning wedge 36.

FIG. 1 illustrates scanning wedge 36 in a first position (solid lines) causing refraction of beam 60 in a direction shown as beam 60a, and in a second position (dashed lines) causing refraction of beam 60 in a direction shown as beam 60b. Rotation of scanning wedge 36 produces a continuous scan pattern shown in FIG. 2, which will be described in greater detail in a subsequent paragraph.

The signal return beam 60 reflected from targets (not shown) is received back at the upper surface of scanning wedge 36 and coupled therethrough back through telescope 30. Return signal beam 60 is circularly polarized as was the transmitted signal, but, on reflection, the polarization is changed mainly to right-circular polarization. The polarization of the received signal beams 60 is converted by quarter-wave plate 26 back to linear polarization, which, in the present example, is referred to as s-polarization. The received signal beam 60 is nearly totally reflected from surface 21 of polarizing beam splitter 20 onto beam combiner 18, where it is reflected from surface 19 toward detector 48.

Local oscillator beam 62, reflected from surface 13 of beamsplitter 12, is directed by mirrored surface 14 through half-waveplate 16, which serves to rotate the plane of polarization of the p-polarized local oscillator beam 62 to match the s-polarization of the target-reflected return beam 60. The polarization-corrected local oscillator beam 62 is now combined with the return beam 60 by beam combiner 18, and the optically combined beam 64 is focused by lens 46 onto the light sensitive surface 49 of homodyne detector 48. Detector 48 is responsive to the optically combined beam 64 to generate a beat signal having as a frequency component the instantaneous difference in the frequencies of the transmitted and the return signal. The homodyned signal is processed by a receiver 66 to filter and amplify the beat frequency signal, and is applied therefrom to controller 44 to detect the Doppler speed of the targets.

Figure 2:
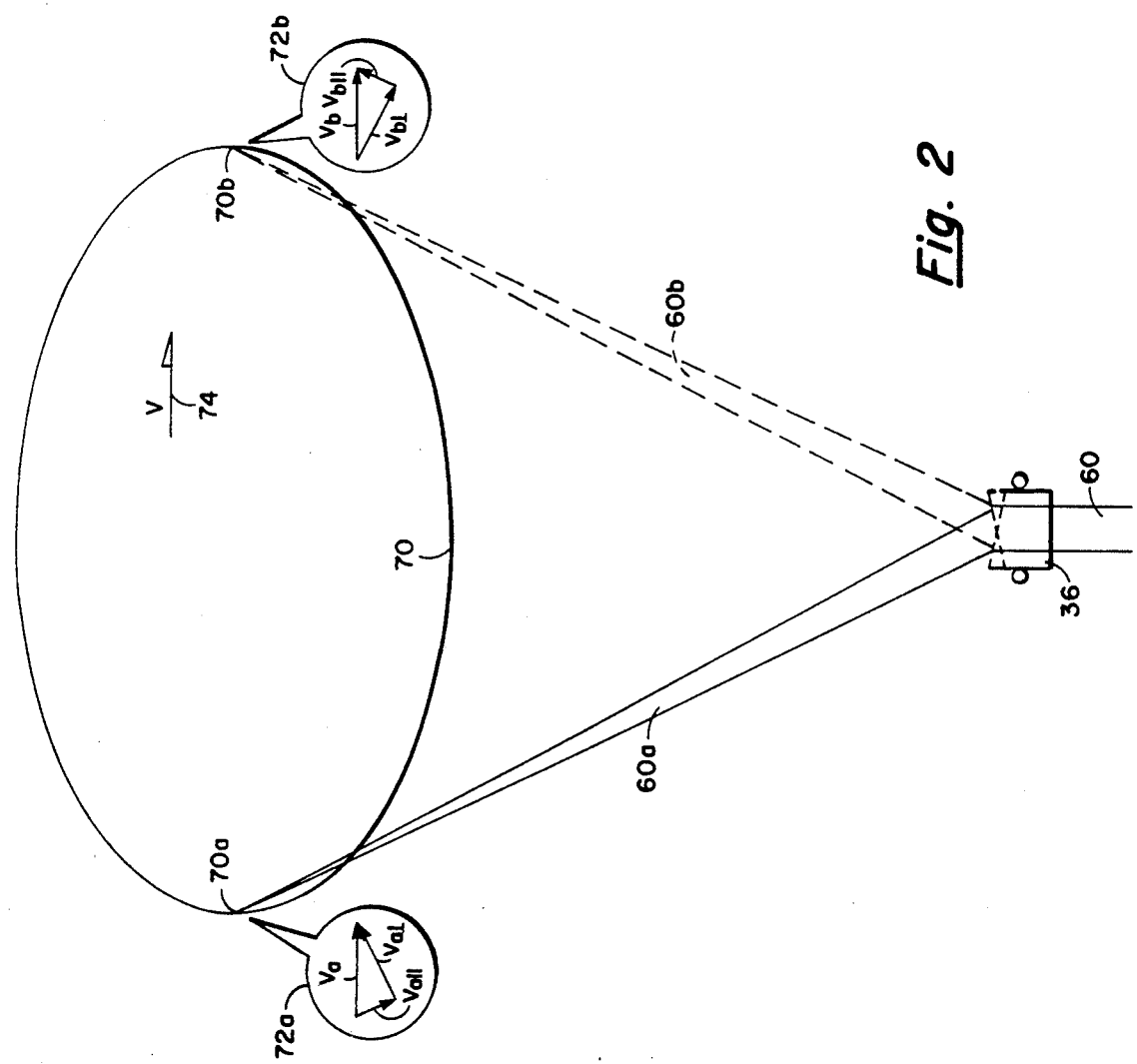
FIG. 2 illustrates a scan pattern of the system of FIG. 1.

Referring now to FIG. 2, there is shown a scan pattern 70 which may be generated by the apparatus of FIG. 1. Beam 60, which is converging as a result of passing through the beam converging lens 34 of telescope 30 (as shown in FIG. 1), to a focal point, which may illustratively be at a distance of 100 meters from the apparatus of FIG. 1, is deflected by scanning wedge 36 to a first focal point 70a. As scanning wedge 36 rotates, the locus of focal points of beam 60 forms a generally circular scan pattern 70.

In the illustration of FIG. 2, aerosols are driven by the wind in an azimuthal direction shown as arrow 74 with a velocity v. At point 70a of scan path 70, the aerosol velocity $v_a$ (as seen in magnified portion 72a) comprises a first velocity component $v_{a|}$, along the direction of beam 60a, and a second velocity component $v_{a\perp}$, perpendicular to the direction of beam 60a. At point 70b of scan path 70, the aerosol velocity $v_b$ (as seen in magnified portion 72b) comprises a first velocity component $v_{b|}$, along the direction of beam 60b, and a second velocity component $v_{b\perp}$, perpendicular to the direction of beam 60b.

Figure 3:
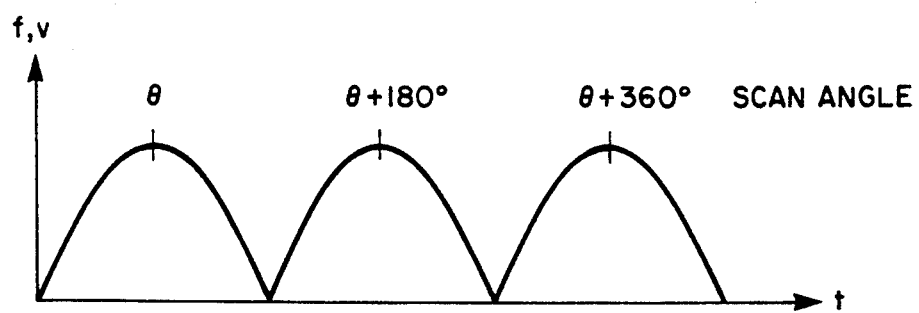
FIGS. 3 and 4 are timing plots useful in understanding the system of FIG. 1.

FIG. 3 illustrates the frequency response, illustratively at the output of receiver 66, over a span of time. (It will be noted that the ordinate is labeled as both frequency and velocity, since it is widely known that Doppler frequency is directly related to velocity.) The plot of FIG. 3 may be derived from scan path 70 (of FIG. 2) wherein a first frequency (velocity) maximum at scan angle $\Theta$ corresponds to point 70a, and a second frequency (velocity) maximum at scan angle $\Theta + 180°$ corresponds to point 70b.

In accordance with the present invention, structure is included within the system thus far described in conjunction with FIG. 1 in order to resolve the ambiguity in wind direction. Referring again to FIG. 1, there is shown a laser frequency modulator unit comprising FM driver 50 and modulator 24 for controlling the position of one of the end mirrors (not shown) in laser 10. FM driver 50 comprises a conventional waveform generator responsive to a signal from system controller 44 to apply an electrical control signal, here an up-ramped triangular waveform 51, to modulator 24. Modulator 24 comprises a transducer, preferably a piezoelectric stack. Modulator 24 responds to such control signal by moving the position of the end mirror of laser 10 coupled thereto, thereby changing the frequency determined by the optical length of the resonant cavity of laser 10 from a nominal frequency by an amount corresponding to the control signal applied to modulator 24. Accordingly, laser 10 resonates at different frequencies and thus modulates the frequency of beam 60 produced by laser 10. In this example, the frequency of beam 60 is modulated in triangular modulation pattern corresponding to the shape of the waveform 51 produced by FM driver 50.

Figure 4:
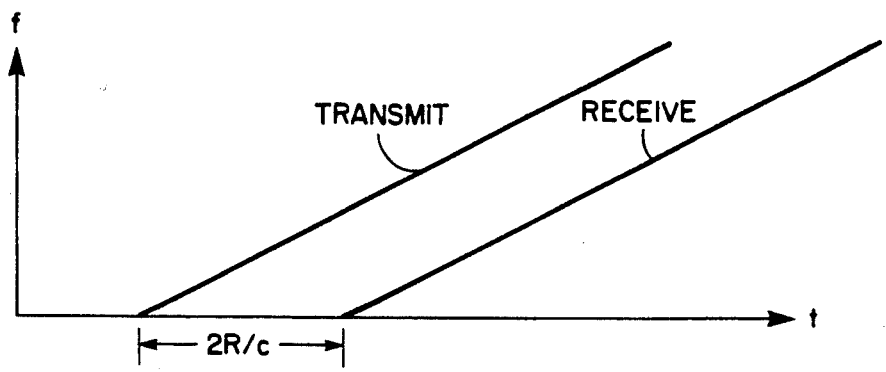
Figure 5:
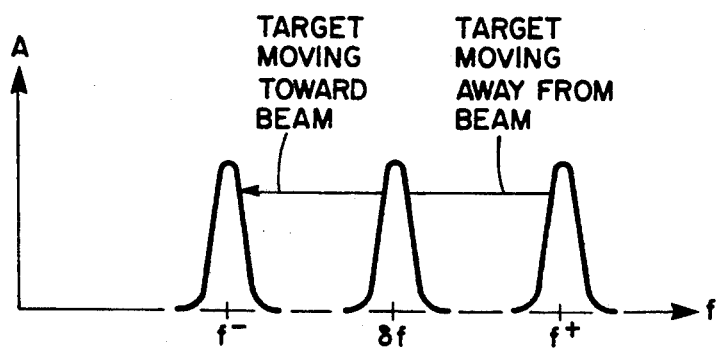
FIG. 5 is a plot on the frequency axis useful in understanding the system of FIG. 1.

Referring to FIG. 4, there is shown the relationship between a transmitted beam and a received beam when the beam frequency is "chirped," as in the triangular modulation of waveform 51 (FIG. 1). It may be seen from FIG. 4 that, during the linear frequency chirp, the frequency of the received beam is offset from the frequency of the transmitted beam by a fixed amount, related specifically to the round trip transit time of the beam, given by 2R/c, where R is the distance to the target and c is the speed of light. For an illustrative target distance of 100 meters, the time delay between the transmitted and received beams is 0.67 µsec.

Considering now an illustrative chirp signal 51 from modulator 24 which causes changes on the resonant cavity of laser 10 which correspond to a change in frequency Δf of beam 60 of 600 MHz over a period of time Δt of 60 µsec. From this illustrative chirp rate of Δf/Δt = 10 MHz/µsec., it may be seen that, during the frequency chirp, for a target distance of 100 meters, the frequency of the transmitted beam will be offset from the frequency of the received beam by 10×0.67=6.7 MHz.

Further in accordance with the present invention, controller 44, in conjunction with the signal information received from receiver 66 and position indicator 40, determines two positions on scan pattern 70, spaced from each other by approximately 180°, for which the aerosols reach maximum velocities. Referring once again to FIG. 2, it will be seen that for a wind direction shown by arrow 74, these maximum magnitudes measurable along beam 60 may be said to occur at points 70a an 70b, which are spaced substantially 180° from one another. Furthermore, it will be recognized that there will exist two points on scan path 70 approximately midway between points 70a and 70b for which the component of velocity magnitude along beam 60 are minimums, shown as the null frequencies in the plot of FIG. 3.

From the determinations of the positions of maximum aerosol velocity, controller 44 generates commands to waveform generator 50 causing up-ramped triangular waveforms to be applied to modulator 24 at positions of scan pattern 70 during, in the preferred embodiment, two consecutive occurrences in the vicinities of maximum detected aerosol velocity. Alternatively, the up-ramped triangular waveforms may be applied at any two non-consecutive maximum velocity detections, so long as they are positionally spaced by approximately 180° in scan path 70, and are sufficiently closely spaced in time that it is unlikely that the wind will change direction in the interim. More broadly, it will be appreciated that the first of the two up-ramped triangular waveforms may be applied at any point in scan path 70, other than at a frequency null, and the second of the two up-ramped triangular waveforms may be applied at any other non-null point on scan path 70 after the occurrence of an odd number of frequency nulls.

Considering now an operational example of the apparatus of FIG. 1, laser 10 is chirped by modulator 24, responsive to an up-ramped waveform signal 51 from waveform generator 50, during an instant while scanning wedge 36 directs beam 60 toward spot 70*a* of scan path 70 (FIG. 2). The beam 60*a* is reflected from a target at point 70*a* and is received at detector 48. Because, at spot 70*a*, the targets are moving generally toward beam 60*a*, the reflected beam received at detector 48 has a frequency comprising the sum of $f_{ia}$, an initial frequency value of the transmitted beam, and $2f_{ia}v_{a|}/c$, the Doppler frequency shift resulting from the movement of a target toward beam 60*a* with an axial velocity $v_{a|}$. This reflected signal will be homodyned with the local oscillator signal having a frequency comprising the sum of $f_{ia}$, the initial frequency value of the transmitted beam, and $\delta f_a$, the extent of the frequency chirp during the round trip transit time of beam 60*a*. Thus, the beat frequency detected by detector 48 from point 70*a* is:

$$(f_{ia}+\delta f_a)+(f_{ia}-2f_{ia}v_{a|}/c)=\delta f_a-2f_{ia}v_{a|i}/c. \quad (1)$$

When scanning wedge 36 directs beam 60 toward spot 70*b* of scan path 70 during the occurrence of an up-ramped waveform signal 51, beam 60*b* is reflected from a target at point 70*b* and is received at detector 48. Because, at spot 70*b*, the targets are moving generally away from beam 60*b*, the reflected beam received at detector 48 has a frequency comprising the difference between $f_{ib}$, an initial frequency value of the transmitted beam, and $2f_{ib}v_{b|}/c$, the Doppler frequency shift resulting from the movement of a target away from beam 60*b* with an axial velocity $v_{b|}$. This reflected signal will be homodyned with the local oscillator signal having a frequency comprising the sum of $f_{ib}$, the initial frequency value of the transmitted beam, and $\delta f_b$, the extent of the frequency chirp during the round trip transit time of beam 60*b*. Thus, the beat frequency detected by detector 48 from point 70*b* is:

$$(f_{ib}+\delta f_b)-(f_{ib}-2f_{ib}v_{b|}/c)=\delta f_b+2f_{ib}v_{b|}/c. \quad (2)$$

that the focal distance of beam 60 is substantially equal along the entire scan path 70, and scan path 70 defines a circle which is substantially parallel to the surface of the earth, it may be said that $\delta f_a$ of Eqn. (1) is approximately equal to $\delta f_b$ of Eqn. (2), and will be referred to as $\delta f$. From this, a comparison of Eqns. (1) and (2) reveals that targets moving generally toward the up-chirped beam of a laser radar system will exhibit a Doppler frequency shift which is negative with respect to $\delta f$, and targets moving generally away from the up-chirped beam will exhibit a Doppler frequency shift which is positive with respect to $\delta f$. (Of course, these frequency shift directions will be reversed for the case of a down-chirped beam modulation.) It will be appreciated that the direction of target movement can thus be determined independent of the magnitude of the target velocity during the two beam frequency chirps, $v_{a|}$ and $v_{b|}$, and independent also of the initial transmitted frequency of the beam, $f_{ia}$ and $f_{ib}$, since only the algebraic sign of the frequency shift term, $2f_iv_|/c$, is required to be considered in determining target direction.

The above-described process is implemented in the apparatus of FIG. 1, and the measurements thus determined are made available for readout by the inclusion of a spectrum analyzer 80, which is responsive to the homodyned frequency output of receiver 66 and to a triggering signal from controller 44 related in time to the up-ramped signal 51 coupled to modulator 24, and display device 82 for providing a visual readout of the frequency spectra generated by spectrum analyzer 80.

At low wind velocities, the above-described system is subject to frequency foldover, i.e., where the offset frequency due to the chirping exceeds the Doppler shift frequency. In this case, the downwardly shifted frequency will be reflected through zero, and may even appear at a frequency higher than the wind velocity frequency. Nevertheless, the upwardly shifted frequency will still result in a higher frequency than the reflected foldover frequency. Therefore, the general rule may be stated as: for an up-chirped beam, the two measurements are compared and the higher frequency of the two relates to the position on the scan path where the wind is moving away from the scanning beam, and the lower frequency of the two relates to the position on the scan path where the wind is moving toward the scanning beam.

The frequency foldover phenomenon may be avoided, in all but the calmest winds, by selecting a lesser chirp rate. For the amount of wind turbulence normally encountered, a bandwidth of 300 KHz is allotted to the wind velocity spectrum. Therefore, a chirp rate which results in a frequency offset of 600 KHz should be sufficient to indicate wind direction while avoiding frequency foldover.

While the principles of the present invention have been demonstrated with particular regard to the apparatus and method disclosed herein, it will be recognized that various departures from such disclosed apparatus and method may be undertaken in the practice of the invention. The scope of this invention is not intended to be limited to the apparatus and method disclosed herein but should instead be gauged by the breadth of the claims which follow.

What is claimed is:

1. In combination:
   means for transmitting a first electromagnetic modulated signal to a first spatial location and for transmitting a second electromagnetic modulated signal to a second spatial location spaced from said first location;
   means for receiving reflections of said first and second signals from aerosols at said respective first and second locations;
   means responsive to said first modulated signal and said reflection from said first spatial location for providing a first beat signal, and responsive to said second modulated signal and said reflection from said second spatial location for providing a second beat signal; and
   means responsive to the relative magnitudes of said first and second beat signals for determining the direction of motion of said aerosols.

2. In combination:
   means for providing an electromagnetic beam converged to a focal point;
   means for scanning said beam such that said focal point describes a closed path;
   means for detecting reflections of said electromagnetic beam from objects at said focal point;
   means coupled to said detecting means for measuring the velocity amplitude of said objects;
   means for modulating the frequency of said electromagnetic beam during measurements of maximum velocity amplitude at two substantially opposing positions of said closed path; and
   means for comparing the instantaneous frequency differences between said modulated beam and said reflections during said two measurements of maximum velocity amplitude.

3. The combination according to claim 2 wherein said means for providing an electromagnetic beam includes a laser for emitting an optical beam.

4. The combination according to claim 3 wherein said providing means further includes refraction means for focusing said optical beam to said focal point.

5. The combination according to claim 3 further including means for directing a portion of said optical beam to said detecting means 6. The combination according to claim 2 wherein said scanning means comprises a rotating wedge.

7. The combination according to claim 2 wherein said closed path approximates a circular shape.

8. The combination according to claim 2 wherein said objects at said focal point comprise airborne aerosols.

9. The combination according to claim 3 wherein said modulating means comprises means for adjusting the length of said laser.

10. The combination according to claim 9 wherein said adjusting means comprises a transducer affixed to one end of said laser.

11. The combination according to claim 10 wherein said transducer comprises a piezoelectric stack.

12. The combination according to claim 3 wherein said modulating means includes means for chirping the frequency of said optical beam toward increasing frequency.

13. The combination according to claim 2 wherein said comparing means includes a spectrum analyzer.

14. A laser radar system comprising:
   a laser for emitting an optical beam;
   refraction means for focusing said optical beam to a focal point;
   a rotating wedge for scanning said optical beam such that said focal point describes a substantially circular path;
   means for detecting reflections of said optical beam from airborne aerosols at said focal point;
   means for directing a portion of said optical beam from said laser into said detecting means;
   means coupled to said detecting means for measuring the velocity amplitude of said aerosols;
   means coupled to said laser for modulating the frequency of said optical beam during measurements of maximum velocity amplitude at two substantially opposing portions of said substantially circular path; and
   means including a spectrum analyzer for comparing the instantaneous frequency differences between said modulated optical beam from said laser and said reflected beam during said two measurements of maximum velocity amplitude.

15. In an apparatus including means for providing an electromagnetic beam converged to a focal point, means for scanning the beam such that its focal point describes a path, means for detecting a reflection of the electromagnetic beam from objects at the focal point, and means coupled to the detecting means for measuring the velocity amplitude of these objects, a method for determining the direction of movement of said objects comprises the steps of:

a. offsetting the frequency of said electromagnetic beam from the frequency of said reflection during velocity amplitude measurements; and b. comparing the frequency differences between said electromagnetic beam and said reflections during velocity amplitude measurements at two distinct positions on said path.

16. In an apparatus including means for providing an electromagnetic beam converged to a focal point, means for scanning said beam such that said focal point describes a closed path, means for detecting reflections of said electromagnetic beam from objects at said focal point, and means coupled to said detecting means for measuring the velocity amplitude of said objects, a method for determining the direction of movement of said objects, said method comprising the steps of:

modulating the frequency of said electromagnetic beam during measurements of maximum velocity amplitude at two substantially opposing positions of said closed path; and comparing the instantaneous frequency differences between said modulated beam and said reflections during said two measurements of maximum velocity amplitude.

17. A method for determining wind direction comprising the steps of:

(a) scanning a laser beam in a substantially circular horizontal plane and detecting aerosol reflections to provide a time-varying Doppler-shifted waveform having maximum amplitudes 180 degrees apart;

(b) transmitting a first modulated signal to the spatial location corresponding to one maximum amplitude and transmitting a second modulated signal to the spatial location corresponding to a second maximum amplitude;

(c) receiving first and second Doppler-shifted reflections from aerosols of said respective first and second modulated signals;

(d) providing a first beat signal from said first Doppler-shifted reflection and said first modulated signal, and a second beat signal from said second Doppler-shifted reflection and said second modulated signal; and (e) determining the direction of motion of said aerosols in response to the relative magnitudes of said first and second beat signals.

* * * * *